(12) United States Patent
Busse

(10) Patent No.: US 9,167,311 B2
(45) Date of Patent: Oct. 20, 2015

(54) VARIANT PLAYLIST OPTIMIZATION

(71) Applicant: Verizon Patent and Licensing Inc., Basking Ridge, NJ (US)

(72) Inventor: Martin A. Busse, Woburn, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 41 days.

(21) Appl. No.: 14/036,603

(22) Filed: Sep. 25, 2013

(65) Prior Publication Data

US 2015/0089557 A1    Mar. 26, 2015

(51) Int. Cl.
*H04N 7/173* (2011.01)
*H04N 21/647* (2011.01)
*H04N 21/24* (2011.01)
*H04N 21/262* (2011.01)
*H04N 21/643* (2011.01)
*H04N 21/2343* (2011.01)
*H04N 21/845* (2011.01)

(52) U.S. Cl.
CPC ... *H04N 21/64769* (2013.01); *H04N 21/23439* (2013.01); *H04N 21/2402* (2013.01); *H04N 21/26258* (2013.01); *H04N 21/6473* (2013.01); *H04N 21/64322* (2013.01); *H04N 21/64738* (2013.01); *H04N 21/8456* (2013.01)

(58) Field of Classification Search
CPC .......... H04N 7/17318; H04N 7/17336; H04N 21/23406

USPC ............... 725/93–96, 114–116; 709/217–232
See application file for complete search history.

(56) References Cited

U.S. PATENT DOCUMENTS

| | | | |
|---|---|---|---|
| 6,510,210 B1* | 1/2003 | Baughan | 379/90.01 |
| 7,231,541 B1* | 6/2007 | Munson | 714/5.1 |
| 7,426,734 B2* | 9/2008 | Debique et al. | 719/310 |
| 8,036,265 B1* | 10/2011 | Reynolds et al. | 375/240.01 |
| 8,707,137 B2* | 4/2014 | Arye | 714/774 |
| 8,707,141 B1* | 4/2014 | Zhang et al. | 714/776 |
| 2008/0144519 A1* | 6/2008 | Cooppan | 370/252 |
| 2011/0191447 A1* | 8/2011 | Dazzi et al. | 709/219 |
| 2012/0265847 A1* | 10/2012 | Swenson et al. | 709/217 |
| 2013/0111038 A1* | 5/2013 | Girard | 709/226 |
| 2013/0275615 A1* | 10/2013 | Oyman | 709/231 |
| 2014/0282765 A1* | 9/2014 | Casey et al. | 725/93 |

* cited by examiner

*Primary Examiner* — Annan Shang

(57) ABSTRACT

A method includes identifying an initial variant playlist for a content item. The initial variant playlist lists a first plurality of bit rate streams. Client devices that receive the content item based on the initial variant playlist are identified. The method includes determining bit rate stream consumption metrics of the client devices for the content item based on the initial variant playlist, and determining an optimized variant playlist based on the initial variant playlist and the consumption metrics of the client devices for the plurality of bit rate streams. The optimized variant playlist lists a second plurality of bit rate streams and substantially optimizes video quality based on streaming resource constraints associated with the at least one client device. The method also includes providing the content item to the client devices based on the optimized variant playlist.

20 Claims, 9 Drawing Sheets

| INITIAL PLAYLIST 502 | BIT RATE 504-1 | BIT RATE 504-2 | BIT RATE 504-3 | BIT RATE 504-4 | BIT RATE 504-5 | BIT RATE 504-6 | BIT RATE 504-7 | BIT RATE ORDER 506 |
|---|---|---|---|---|---|---|---|---|
| PC IV PLAYLIST | 100 | 200 | 400 | 600 | 800 | 1000 | 2000 | 4, 1, 2, 3, 5, 6, 7 |
| CTV IV PLAYLIST | | | | | 800 | 1000 | 2000 | 7, 6, 5 |
| MOBILE IV PLAYLIST | 100 | 200 | 400 | 600 | 800 | 1000 | | 2, 3, 4, 5, 6, 1 |

FIG. 5

| OPTIMIZED PLAYLIST 702 | BIT RATE 704-1 | BIT RATE 704-2 | BIT RATE 704-3 | BIT RATE 704-4 | BIT RATE 704-5 | BIT RATE 704-6 | BIT RATE 704-7 | BIT RATE ORDER 706 |
|---|---|---|---|---|---|---|---|---|
| PC PLAYLIST | 200 | 400 | 600 | 700 | 800 | 1000 | 1200 | 4, 1, 2, 3, 5, 6, 7 |
| CTV PLAYLIST-F | | | | 700 | 800 | 1000 | 1200 | 7, 6, 5, 4 |
| CTV PLAYLIST-D | | | 400 | 600 | 800 | 1000 | 1200 | 5, 6, 4, 7 |
| MOBILE PLAYLIST | 100 | 200 | | | | | | 2, 3, 4, 5, 6, 1 |

FIG. 7

VARIANT PLAYLIST OPTIMIZATION

BACKGROUND

Many of today's entertainment or communication-related electronic user devices rely on receiving, transmitting, and/or using streaming digital data or content. Adaptive bit rate streaming is a technique for streaming digital data (particularly, multimedia content) over digital networks. Adaptive bit rate streaming may include detecting a bandwidth capacity and CPU capacity of the user device in real time and adjusting the quality of a video stream accordingly to allow continuous streaming with a highest quality stream of the different bit rate streams corresponding to a current bandwidth capacity and CPU capacity of the user device.

In some implementations, a streaming client of a user device may access a manifest file (also referred to as a variant playlist file) that identifies different streams of an identical piece of content available for download at differing bit rates. The streaming client may also access index files that identify segments of the streams, and the order in which the segments are to be played. In some instances, when starting streaming of content, the streaming client requests segments from the lowest bit rate stream from a streaming server.

BRIEF DESCRIPTION OF THE DRAWINGS

FIG. 5 illustrates an exemplary initial variant playlist;

FIG. 7 illustrates an exemplary optimized variant playlist;

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed. As used herein, the term "content" may refer to audio and/or video content (e.g., a movie, a three-dimensional (3D) movie, show, television program, video stream, audio stream, Internet radio, broadcast of a live event (e.g., sporting event, concert, etc.)).

Systems and/or methods described herein may determine an optimized variant playlist of different bit rate streams corresponding to a same video content item based on consumption metrics of client devices that initially receive bit rate streams based on an initial variant playlist. The systems may monitor consumption metrics by multiple client devices in one or more networks for segment files from different bit rate streams in an initial variant playlist. The systems may determine additional streams that may be included in an optimized variant playlist that may substantially increase video quality provided to client devices based on constraints associated with streaming resources, such as CPU capacity, network bandwidth, etc., associated with the user devices based on the statistical distribution. The systems may generate additional streams that include different bit rates based on the optimized selection.

Consistent with embodiments described herein, the systems may determine different optimized variant playlists based on common factors associated with the different groupings of user devices, such as a type of network or network conditions, a type of user device, and/or bandwidth constraints. Based on the statistical distribution of stream consumption, the system may identify different starting bit rates (i.e., different starting bit rate streams). In some implementations, the systems may limit a number of different bit rate streams in an optimized variant playlist (e.g., for operational reasons). For example, the system may be constrained by limits on storage capacity for the different bit rate streams and may limit or reduce a number of bit rate streams based on the streams that are least used by the user devices.

Figure 1:
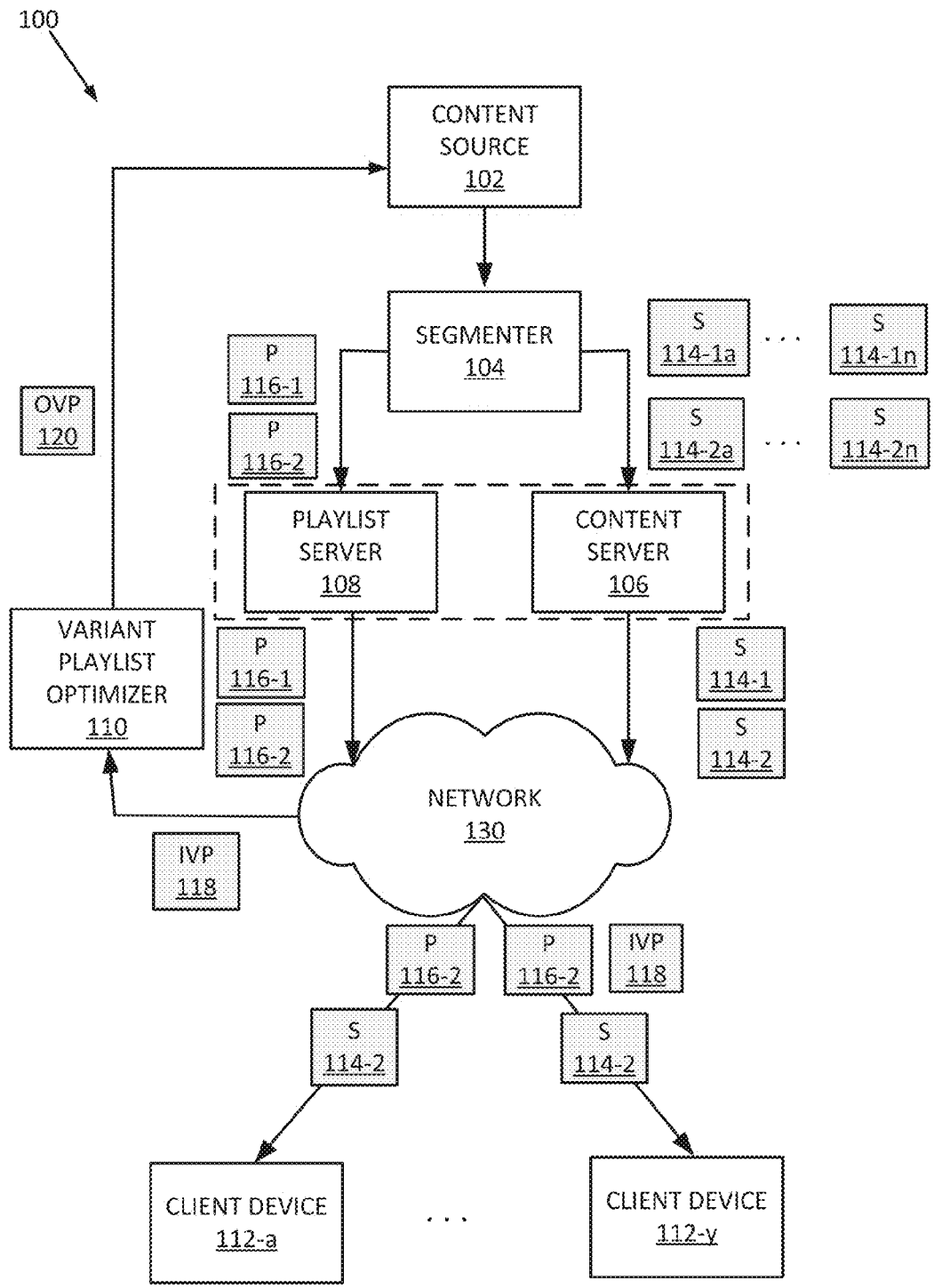
FIG. 1 illustrates an exemplary system for streaming content.

FIG. 1 is a block diagram of an exemplary network 100 in which systems and methods described herein may be implemented. As shown, system 100 may include a content source 102, a segmenter 104, a content server 106, a playlist server 108, a variant playlist optimizer 110, a plurality of client devices 112 (shown as client devices 112-*a* to 112-*y*), and a network 130. These components/devices are described below in greater detail with references to FIGS. 2-8.

Briefly, content source 102 may include a live or prerecorded audio or video source. An encoder (not shown) associated with content source 102 may receive a signal from source 102 and encode the media to include a format such as, for example, H.264, MPEG-4 Advanced Video coding (AVC), high efficiency advanced audio coding (HE-AAC), etc. Source 102 may send the encoded media in a transport stream (e.g., MPEG-2) to segmenter 104 for downstream processing. The encoder may encode the content source at different bit rates to form different bit rate streams for the same content item. A bit rate stream is a media stream that is provided at a particular bit rate. Content source 102 may generate a plurality of bit rate streams corresponding to a particular content item (e.g., a movie or television show). Multiple different bit rate streams for a same content item may be referred to as variant streams.

Segmenter 104 may receive (or retrieve) the bit rate streams corresponding to the content item and partition the streams into a plurality of segments corresponding to the each of the different bit rate streams. Segmenter 104 may be configured to split a source content from content source 102 into a number of stream segments corresponding to media streams for the particular content. In some instances, segmenter 104 may be configured to generate segments corresponding to more than one stream, such as a number of bit rate streams for differing quality, bit rates, output resolution, etc. This concept is schematically illustrated in FIG. 1 as segment group 114-1 associated with a first stream and segment group 114-2 associated with a second stream. As shown in FIG. 1, content segments 114-*1a* to 114-1*n* correspond to stream group 114-1, and 114-2*a* to 114-2*n* correspond to stream group 114-2, (collectively referred to as "segments 114") in FIG. 1. For ease of discussion, stream groups 114 are described as corresponding to different bit rate streams, however it should be understood the concepts described herein may be applied to streams of differing quality, resolution, etc.

Segmenter 104 may generate one or more index files or playlists 116 (e.g., playlists 116-1 and 116-2) that indicate the order in which segments 114 are to be played for each respective bit rate stream and that additionally point to the locations of segments 114. Segmenter 104 may generate a number of playlist files 116 corresponding to the number of variant streams indicated in the variant playlist. As above in relation to the various segment groups 114, when segmenter 104 has generated information for multiple bit rate streams, segmenter 104 generates a corresponding number of playlists 116, referred to as playlist 116-1 and playlist 116-2 in FIG. 1. The playlist files indicate the order in which the segments are to be played and identify the individual media files for download by client devices. Examples of index/playlist files 116 may include M3U8 files, M3U files, PLS files, Advanced Stream Redirector (ASX) files, etc.

Segmenter 104 may generate a file that identifies different bit rate streams available for download. When multiple bit rate streams are provided for a single content item, content source 102 may generate a file 118 that identifies the various available bit rate streams and their corresponding playlist files 116. This file 118 is sometimes referred to as a manifest file or variant playlist. Depending on the streaming protocol implemented, file 118 may be referred to by different names. For HTTP Live Streaming from Apple Inc., the file is referred to as a variant playlist (VP). For Smooth Streaming from Microsoft® the file is referred to as a manifest file or client manifest file (e.g., an .ismc file). For Adobe® Flash the file is referred to as a "smil" file. Although named and formatted differently, each of these file types includes similar types of information relating to identifying a number of different available bit rate streams for a particular content item. For ease of description, file 118 is referred to herein as initial variant playlist (IVP) 118. Processes described herein may optimize the initial variant playlist 118 that is initially provided to client devices 112 to form an optimized variant playlist (OVP) 120. The optimization of the IVPs 118 to form OVPs 120 may be implemented in conjunction with content source 102 in instances in which optimizations require new bitrates to be generated (by content source 102) and/or new playlists within a variant playlist in instances in which the new OVP 120 is created using existing bit rate streams.

Stream segments 114 and playlists 116 may be distributed or served to client devices 112 via content server 106 and playlist server 108, respectively, over network 130. It should be noted that, although content server 106 and playlist server 108 are shown as distributed or separate devices in FIG. 1, in other implementations these servers may be located/executed from the same physical server or group of servers. Consistent with implementations described herein, IVP 118 may be transmitted or otherwise relayed to variant playlist optimizer 110.

Content server 106 may include (or provide access to storage locations for) segments 114 generated by segmenter 104. Content server 106 may provide a number of different streams of an identical piece of content, such as content streams (identified in IVP 118, or, after further processing described herein, OVP 120) corresponding to a number of different criteria, such as bandwidth, bit rate, resolution, etc.

Playlist server 108 may include playlists 116 generated by segmenter 104. Playlist server 108 may also include IVPs 118 and/or OVPs 120 which may be provided by segmenter 104. Playlist server 108 may provide playlists 116, IVPs 118 and/or OVPs 120 to client devices 112 in response to requests for particular playlists 116 received from client devices 112.

Client device 112 may request and receive variant playlists, such as IVP 118 or OVP 120 from playlist server 108. Client device 112 may, based on various factors, such as available bandwidth and output resolution, select a particular bit rate stream identified in the variant playlist. Client devices 112 may access a particular playlist 116 (e.g., playlist 116-1) identified in the variant playlist (i.e., in IVP 118 or OVP 120) and may receive and play content segments 114 (e.g., segments 114-1) in accordance with the information provided in the particular playlist 116-1.

As described herein, variant playlist optimizer 110 may refer to any device or combination of devices configured to determine different OVPs 120 based on bit rate stream consumption statistics for bit rate streams identified in IVP 118 from client devices 112 via network 130. The bit rate stream consumption statistics may be measured based on a number of segments from the bit rate streams that the client device 112 receives when streaming the content item. An OVP 120 is a variant playlist that includes an optimal selection of bit rate streams that supports an optimal usage of streaming resources associated with the client devices 112. The optimal section of bit rate streams may include bit rate streams identified in the IVP 118 on which the OVP 120 is based, as well as additional optimized bit rate streams that supplement or replace bit rate streams identified in the IVP 118. The optimized bit rate streams included in OVP 120 may substantially increase or optimize usage of streaming resources associated with the client devices 112. Optimized bit rate streams may include bit rate streams determined based on bit rate stream consumption statistics for different bit rate streams in IVP 118 associated with a particular group of client devices 112.

Depending on the implementation, system 100 may include additional, fewer, or different components than those illustrated in FIG. 1. For example, in one implementation, system 100 may include additional content sources 102, segmenters 104, variant playlist optimizers 110, client devices 112, etc. Furthermore, although not illustrated in FIG. 1, in an actual implementation, system 100 may include different network components, such as switches, bridges, routers, gateways, firewalls, different types of client/server devices, etc.

Figure 2:
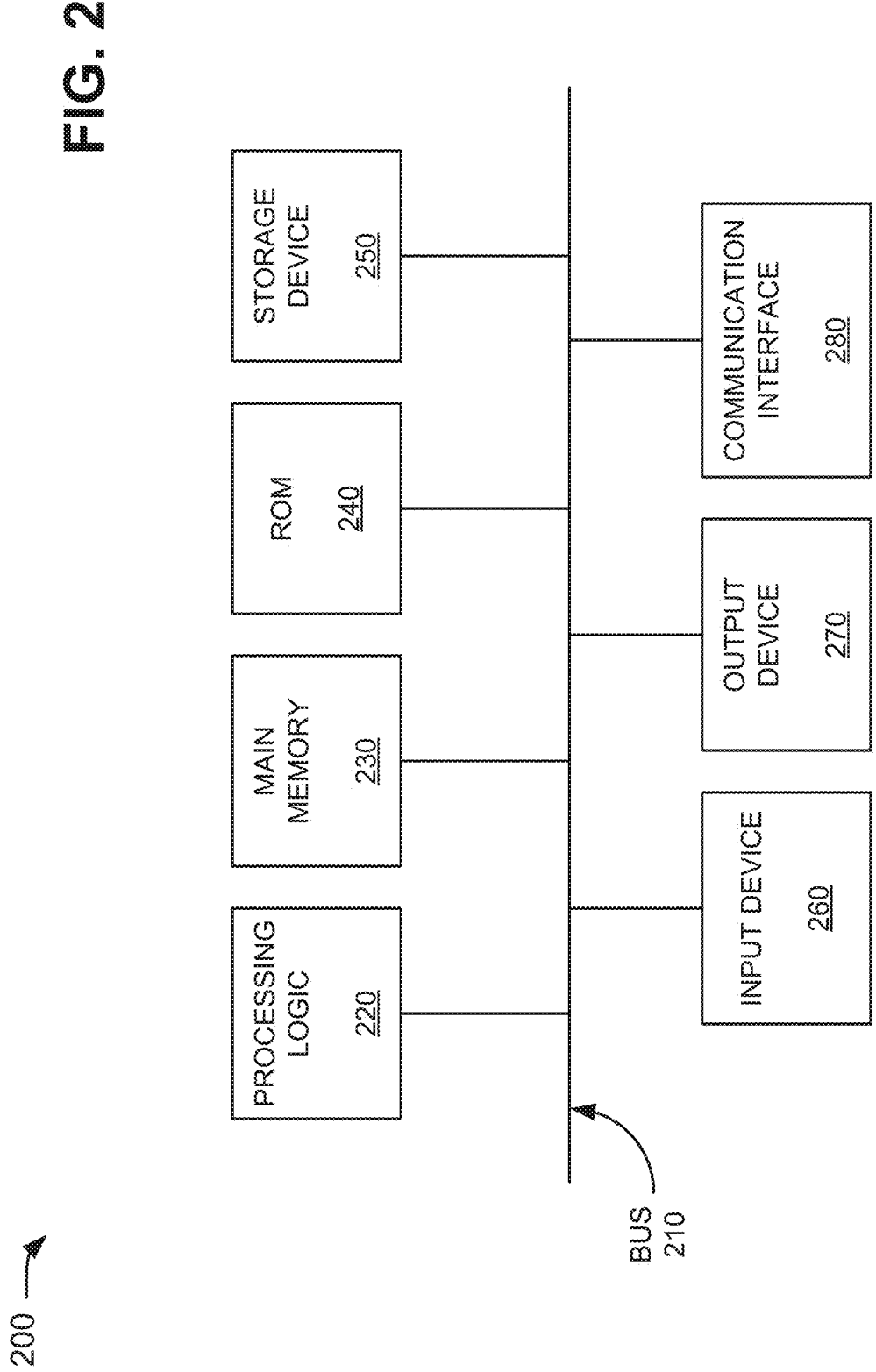
FIG. 2 illustrates exemplary components of one or more devices depicted in FIG. 1.

FIG. 2 is an exemplary diagram of a device 200 that may correspond to any of segmenter 104, content server 106, playlist server 108, variant playlist optimizer 110, and/or client device 112. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing machine-readable instructions (i.e., software instructions) contained in a computer-readable medium, such as main memory 230. A computer-readable medium may be defined as a physical or logical memory device. The machine-readable instructions may be read into main memory 230 from another computer-readable medium, such as storage device 250, or from another device via communication interface 280. The machine-readable instructions contained in main memory 230 may cause processing logic 220 to perform processes described herein. Alternatively, hardwired circuitry may be used in place of or in combination with machine-readable instructions to implement processes described herein. Thus, implementations described herein are not limited to any specific combination of hardware devices, circuitry, and/or machine-readable instructions.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
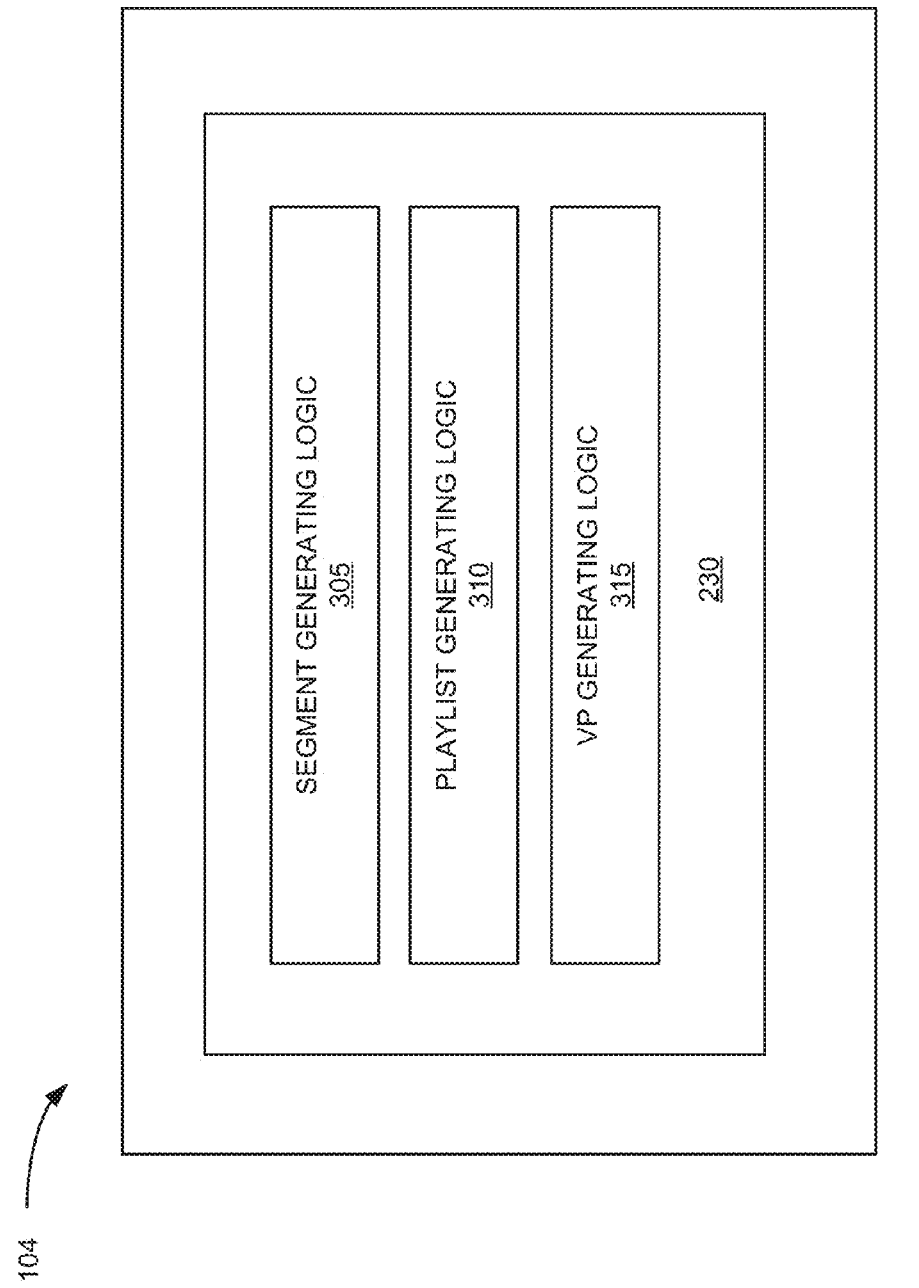
FIG. 3 is an exemplary functional block diagram of components implemented in the segmenter of FIG. 1.

FIG. 3 is an exemplary functional block diagram of components implemented in segmenter 104. In an exemplary implementation, all or some of the components illustrated in FIG. 3 may be stored in memory 230. For example, referring to FIG. 3, memory 230 may include segment generating logic 305, playlist generating logic 310, and variant playlist (VP) generating logic 315. In addition, various logic components illustrated in FIG. 3 may be implemented by processing logic 220 executing one or more programs stored in memory 230.

As described briefly above, segment generating logic 305 may include logic for generating segments for one or more video audio/streams. For example, as briefly described above, segment generating logic 305 may receive/retrieve an encoded source content item from content source 102 and generate even length stream segments corresponding to the source (i.e., stream segments of a constant length). The stream segments may be formatted based on the implemented streaming protocol (e.g., HTML Live Streaming, Smooth Streaming, Flash, etc.). Segment generating logic 305 may generate segment files for multiple streams, such as streams having different bit rates, resolutions, etc. In addition, as described below, segment generating logic 305 may receive instructions (e.g., from variant playlist optimizer 110) to generate additional segment files corresponding to optimized bit rate streams. In some implementations, the stream segments may be stored as sequential transport stream (.ts) files. Segment generating logic 305 may store the generated stream segments on content server 106 for retrieval by client device 112.

Playlist generating logic 310 may include logic for generating a playlist file 116 corresponding to each bit rate stream. More specifically, playlist generating logic 310 may be configured to generate playlist files 116 that identify the location (on network 130), duration, and sequence numbering of the segment files 114 corresponding to particular bit rate streams. In addition, as described below, playlist generating logic 310 may receive instructions (e.g., from variant playlist optimizer 110) to generate playlist files corresponding to optimized bit rate streams included in OVP 120. Playlist generating logic 310 may store the generated playlist files 116 corresponding to the particular initial bit rate streams and the optimized bit rate streams on playlist server 108 for retrieval by client devices 112.

Variant playlist generating logic 315 may include logic for generating IVP 118 identifying the various available media streams 116 corresponding to each particular content item from content source 102. More specifically, VP generating logic 315 may be configured to generate IVP 118 that includes the identities, attributes, and locations of playlist files 116 corresponding to the available media streams. In addition, as described below, VP generating logic 315 may receive instructions (e.g., from variant playlist optimizer 110) for generating OVP 120 that includes the identities, attributes, and locations of playlist files corresponding to the optimized media streams determined by variant playlist optimizer 110.

Figure 4:
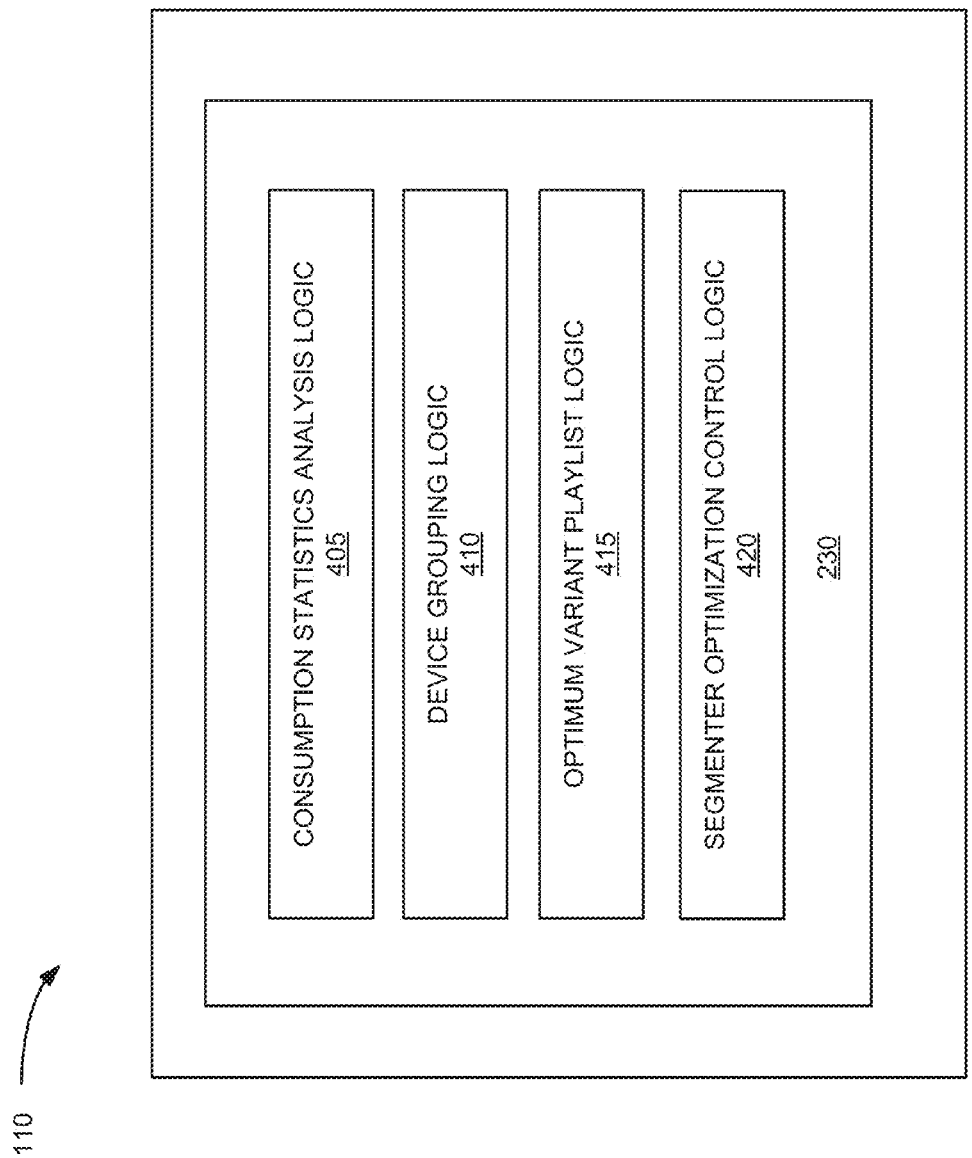
FIG. 4 is an exemplary functional block diagram of components implemented in the variant playlist optimizer of FIG. 1.

FIG. 4 is an exemplary functional block diagram of components implemented in variant playlist optimizer 110. In an exemplary implementation, all or some of the components illustrated in FIG. 4 may be stored in memory 230. For example, referring to FIG. 4, memory 230 may include consumption statistics analysis logic 405, device grouping logic 410, optimum variant playlist (OVP) logic 415, and segmenter optimization control logic 420. In addition, various logic components illustrated in FIG. 4 may be implemented by processing logic 220 executing one or more programs stored in memory 230. Variant playlist optimizer 110 is described with respect to FIGS. 5, 6, 7 and 8, which illustrate, respectively, an initial variant playlist table 500, an initial stream consumption distribution 600, an optimized variant playlist table 700, and a projected optimized stream consumption distribution 800.

Variant playlist optimizer 110 may be implemented at a data center, head-end unit (e.g., a super and/or local head-end unit), base station, central office, video hub office ("VHO"), video serving offices ("VSDs"), network node, other suitable locations, or at any combination of one or more of these locations. In some implementations, variant playlist optimizer 110 may be logically separated from client device 112 by several entities, such as a super head-end, VHO, and/or VSO. Variant playlist optimizer 110 may receive consumption statistics associated with different client devices 112 for IVPs 118.

Briefly, as shown in FIG. 5, initial variant playlist table 500 may include IVPs 118 that corresponds to different types of client devices 112 (shown in the first column of FIG. 5, as personal computer (PC) initial variant playlist 118-1, a connected television (CTV) initial variant playlist 118-2, and a mobile (device) initial variant playlist 118-3). A service provider may provide different bit rates for different types of devices and according to differing quality standard. For example, the service provider may provide different bit rates for mobile devices, PC, connected TV. IVPs 118 may be provided to client devices 112 based on a particular type of client device 112. Each IVP 118 may include multiple available streams at different bit rates that may be requested by corresponding client devices 112 that receive the IVPs 118. IVPs 118 may include a predetermined number of bit rate streams. For example, PC initial variant playlist 118-1 includes bit rate streams of 100, 200, 400, 600, 800, 1000, and 2000 kilobits per second (kbps) for an identical piece of particular content that may be provided to PC client devices 112. Additionally, each IVP 118 may include a suggested order 506 of selection for bit rate streams given to the client devices 112. IVP 118 includes identifiers, attributes, and locations corresponding with available variant media streams (i.e., bit rate streams) associated with the selected media item.

As described briefly above, client devices 112 may receive IVP 118 from playlist server 108.

Client devices 112 may select in real time (or near real time), particular media streams for downloading of the particular content based on usage characteristics, such as available bandwidth, stream bit rate, output resolution, etc. Client devices 112 may access playlist file 116 that lists storage locations (e.g., universal resource locator (URL) or uniform resource identifier (URI), network addresses, etc.) of content file segments in an order that the segments are to be reassembled and/or output by client device 112. Client devices 112 may request/receive a particular segment stream and then adjust upwards or downwards by selecting other bit rate streams listed in IVP 118 based on the bandwidth. If the client device 112 has enough bandwidth to process a higher bit rate stream, client device 112 may request the higher bit rate stream (e.g., the next higher bit rate stream). If the client device 112 does not have enough bandwidth to process the current bit rate stream, client device 112 may request a lower bit rate stream, to ensure that client device 112 can continuously stream the content. Client device 112 may attempt to keep a buffer in client device 112 as close to continuously full as allowed based on the bit rate streams. In some implementations, client devices 112 may report a percentage of capacity used in streaming the content (or the excess or unused streaming capacity) to variant playlist optimizer 110, in particular consumption statistics analysis logic 405.

Referring now to FIG. 4, consumption statistics analysis logic 405 may receive consumption statistics for different bit rate streams in IVPs 118 that may be provided to particular client devices 112. Consumption statistics analysis logic 405 may analyze consumption patterns of the different bit rate streams and determine consumption distribution of the bit rate streams associated with the particular client devices 112. Consumption statistics analysis logic 405 may include one or more devices capable of determining consumption of different bit rate streams by client devices 112 via network 130, such as one or more servers, routers, etc. Consumption statistics analysis logic 405 may also receive reports from client devices 112 identifying excess CPU capacity or bandwidth capacity that is not used in streaming the content. In some instances consumption statistics analysis logic 405 may identify or estimate a percentage of streaming resources used by each client device 112.

In some implementations, consumption statistics analysis logic 405 may determine that client devices 112 has consumed (i.e., the user has watched) the media stream for more than a minimum period of time (e.g., 30 seconds), or that more than a minimum number of stream segments have been output and store an identification of the bit rate stream and corresponding usage time by client devices 112. This identification may be used in determining consumption statistics for the different bit rate streams. Consumption statistics analysis logic 405 may monitor consumption statistics by multiple user devices in one or more networks for segment files from different bit rate streams in an IVP 118 listed in initial variant playlist table 500.

Figure 6:
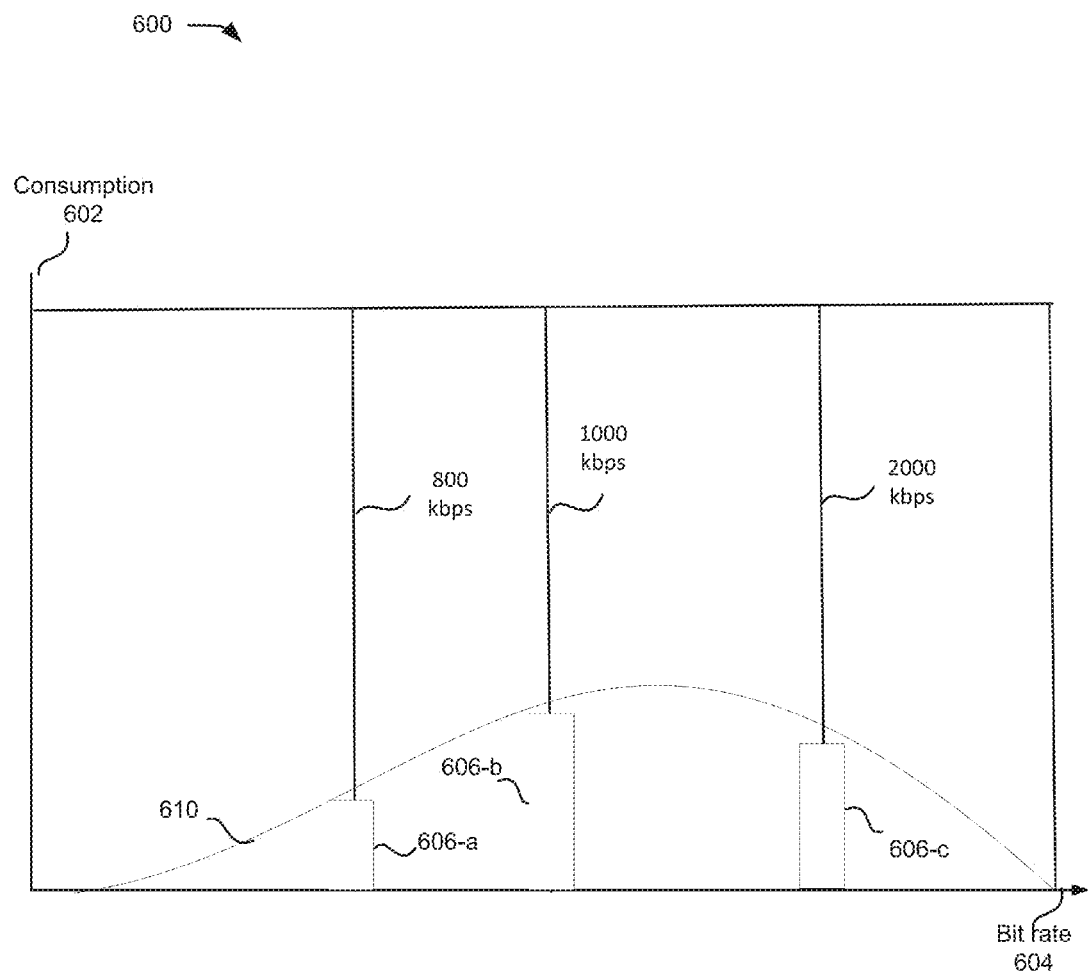
FIG. 6 illustrates an exemplary initial bit rate stream consumption distribution corresponding to the initial variant playlist of FIG. 5.

In any regard, as shown in FIG. 6, consumption statistics analysis logic 405 may determine bit rate stream consumption distribution 600 (i.e., a usage statistical distribution for client devices 112) that indicates the amount of consumption 602 of each segment or bit rate stream at a particular bit rate 604. Bit rate stream consumption distribution 600 may be determined based on actual consumption metrics for multiple client devices 112 that receive IVP 118 and subsequently select bit rate streams. Original expected usage distribution 610 may provide an (expected) statistical distribution of the usage of bit rate streams associated with client devices 112 that receive bit rate streams. In some implementations, the IVPs 118 in network 100 may be selected and/or determined based on the original expected usage distribution 610. Rates of consumption 606 of bit rate streams (shown on x-axis) may be determined based on a number of times that client devices 112 request the particular bit rate streams or as a percentage of the total consumption of segments for all bit rate streams in IVP 118s associated with a group or sub-group of client devices 112 (e.g., client devices grouped based on network, location, etc.). For example, the consumption rate 606-a for 800 kbps bit rate stream may be 20 percent of segment consumption while the consumption rate 606-b for 1000 kbps may be 45 percent of the total segment consumption.

Client devices 112 may select and consume bit rate streams based the client devices 112 having a bit rate capacity that is higher than the requested bit rate stream but lower than the next higher bit rate stream (e.g., a client device 112 with a capacity to select a 1500 kbps bit rate stream will select the next lower available bit rate stream, in this instance 1000 kbps bit rate stream). The consumption distribution 600 may be determined over a predetermined time window of operation for the network. For example, consumption distribution 600 may be determined for peak viewing hours of network 130. Segment consumption may be determined for client devices 112 associated with each IVP 118. In some instances, as shown in FIG. 6, the actual bit rate stream consumption distribution 600 may be (closely) correlated with original expected usage distribution 610. However, in other instances, the consumption distribution 600 may deviate from the original expected usage distribution 610, for example, based on bandwidth capacity restrictions associated with client devices 112. In these instances, based on the consumption distribution 600, consumption statistics analysis logic 405 may provide an indication that IVP 118 is to be optimized, including generating new bit rate streams, in order to more closely align the variant playlist with the consumption distribution 600.

Device grouping logic 410 may identify different subgroups of client devices 112 (e.g., associated with a particular IVP 118) that have a same consumption distribution 600 (i.e., a particular consumption pattern for different bit rate streams), which is different than a consumption pattern of other subgroups of devices 112, within a group of client devices 112 that receives a same IVP 118. Device grouping logic 410 may analyze information associated with the client devices 112 to identify common characteristics associated with the subgroups that have the same consumption distribution 600. For example, device grouping logic 410 may identify that the client devices 112 that have the same consumption distribution 600 are connected via a particular type of network (e.g., Fiber, digital subscriber line (DSL), long term evolution (LTE)), are located in a particular geographical area, are served by a particular Internet service provider (ISP), are of a particular subtype of device (e.g., devices in the same class of device (e.g., PCs) may be included in a subgroup based on a particular attribute, such as processing speed, buffer size, etc.), etc. Device grouping logic 410 may gather analytics information from usage of different streams segmented by geographic location, ISP, network, etc. Device grouping logic 410 may group client devices 112 that have common characteristics and a same consumption pattern.

OVP logic 415 may determine OVPs 120 that include an optimized selection of bit rate streams to replace corresponding IVPs 118 that are provided to particular client devices 112. OVP logic 415 may determine, based on the consumption distribution 600, a selection of bit rate streams that substantially optimizes video quality for client devices 112. OVP logic 415 may also determine, as a part of the process of optimizing video quality for the client devices 112, whether additional optimized bit rate streams may be implemented to substantially increase or optimize utilization of streaming resources associated with client devices 112. OVP logic 415 may determine the selection of bit rate streams for the OVP 120 within particular stream selection parameters or requirements. The stream selection parameters for the OVP 120 may include a maximum and/or minimum threshold number of streams (e.g., a maximum of seven bit rate streams may be allowed), a required maximum or minimum bit rate for streams (i.e., to meet service level agreements (SLAs), compliance with bit rate caps, or to ensure continuous streaming at the particular lower bit rate), a standard unit number of bit rate (e.g., bit rates may only be allowed to increase in increments of 50 kbps). OVP logic 415 may supplement or replace bit rate streams included in IVPs 118 based on the stream selection parameters when generating corresponding OVPs 120.

OVP logic 415 may determine an optimized variant playlist table 700 as shown in FIG. 7. Optimized variant playlist table 700 may replace initial variant playlist 600 and includes OVPs 120 that may be provided to client devices 112 based on a particular type of client device 112. As shown in FIG. 7, OVPs 120 may correspond to different types of client devices 112 (shown in the first column of FIG. 7, as PC optimized variant playlist 120-1, a CTV (Fiber) optimized variant playlist 120-2-F (indicating connected TVs that receive service via a fiber network), a CTV (DSL) optimized variant playlist 120-2-D (indicating connected TVs that receive service via a DSL network), and a mobile optimized variant playlist 120-3). OVPs 120 may replace and correspond to IVPs 118. In instances in which a group of client devices 112 (e.g., CTVs) is divided into subgroups (e.g., CTVs Fiber and CTVs DSL), multiple OVPs 120 (e.g., CTV 120-F and CTV 120-D) may correspond to (and when implemented, replace) a single IVP 118 (e.g., CTV 120).

Each OVP 120 may include optimized bit streams at different bit rates that may be requested by corresponding client devices 112 that receive the OVPs 120. OVPs 120 may include optimized bit rate streams that supplement or replace bit rate streams included in corresponding IVPs 118. For example, whereas PC initial variant playlist 118-1, shown in FIG. 5, included bit rate streams 504-1 to 504-7 corresponding to bit rate streams of 100, 200, 400, 600, 800, 1000, and 2000 kbps for a particular content item, the corresponding PC optimized variant playlist 120-1 (i.e., after IVP 118 has been optimized to from OVP 120), shown in FIG. 7, includes bit rate streams 704-1 to 704-7 corresponding to bit rate streams of 200, 400, 600, 700, 800, 1000, and 1200 kbps. Additionally, each OVP 120 listed in optimized variant playlist table 700 may include a suggested order 706 given to client devices 112. OVP 120 includes identifiers, attributes, and locations corresponding with optimized variant media streams associated with the selected media item. OVP 120 may also include an identifier for subgroups associated with OVP 120 that may be used for purposes of routing or selection of OVPs 120 in association with particular subgroup of client devices 112.

OVP logic 415 may determine OVPs 120 for subgroups of client devices 112 identified by device grouping logic 410. OVP logic 415 may compare prospective optimized streams for different groups of client devices 112 and determine whether particular bit rate streams are to be generated based on overlap of prospective optimized streams to be included in OVPs 120 for the different client devices 112. For example, OVP logic 415 may identify a first set of prospective optimized streams to be generated in association with a first OVP 120 for a first group of client devices 112 (e.g. PCs). OVP logic 415 may identify a second set of prospective optimized streams to be generated in association with a second OVP 120 for a second group of client devices 112 (e.g. mobile devices). OVP logic 415 may determine whether to generate prospective optimized streams based on overlap of prospective optimized streams. This may allow efficiencies in instances in which different OVPs 120 are provided to different groups of client devices 112 from a same network. In another example, OVP logic 415 may determine OVPs 120 that include the optimized bit rate streams based on different consumption characteristics for differing types of client devices 112 over a same network. OVP logic 415 may also identify processing costs associated with generating the optimized streams and use the processing costs as a factor in determining whether to generate optimized streams, and a particular combination of optimized streams to be generated.

According to one implementation, OVP logic 415 may simulate bit rate stream consumption based on a combination of existing bit rate streams and prospective bit rate streams to determine a selection of optimized bit rate streams with the optimal probability of increasing video quality for the client devices 112. OVP logic 415 may identify (or target) a prospective consumption metrics for client devices 112 for a particular prospective bit rate stream and identify a predetermined target deviation of consumption metrics for the client devices 112. OVP logic 415 may select a combination of (current) bit rate streams and prospective bit rate streams to be implemented in an OVP 120 based on the simulated consumption metrics falling within the predetermined target deviation.

In one embodiment, OVP logic 415 may replace one of the bit rate streams included in IVP 118 with an optimized stream to create the OVP 120. OVP logic 415 may select the bit rate stream to be replaced based on a low usage rate of the particular bit rate stream, According to one example, described with respect to initial PC playlist 118-1 shown in FIG. 5 and optimized PC playlist 120-1 shown in FIG. 7, OVP logic 415 may determine a selection of bit rate streams that provides continuous service while discarding low used higher bit rates 2000 k (high end) and low used lower bit rates (100 kbps) and introducing one or more intermediate bit rate streams. For example, OVP logic 415 may determine that an intermediate bit rate stream between 1000 kpbs bit rate stream and 2000 kbps bit rate stream may substantially increase the video quality (i.e., bit rate) for client devices 112 (e.g., 1200 kbps). OVP logic 415 may provide instructions to content source 102 to generate the optimized bit rate streams.

Segmenter optimization control logic 420 may provide instructions to segmenter 104, for example, as described with respect to FIG. 3 herein above, to implement OVPs 120 in conjunction with content source 102. The instructions may include instructions for generating index files 116 corresponding to OVPs 120, instructions for generating optimized bit rate streams corresponding to the OVPs 120, etc.

Figure 8:
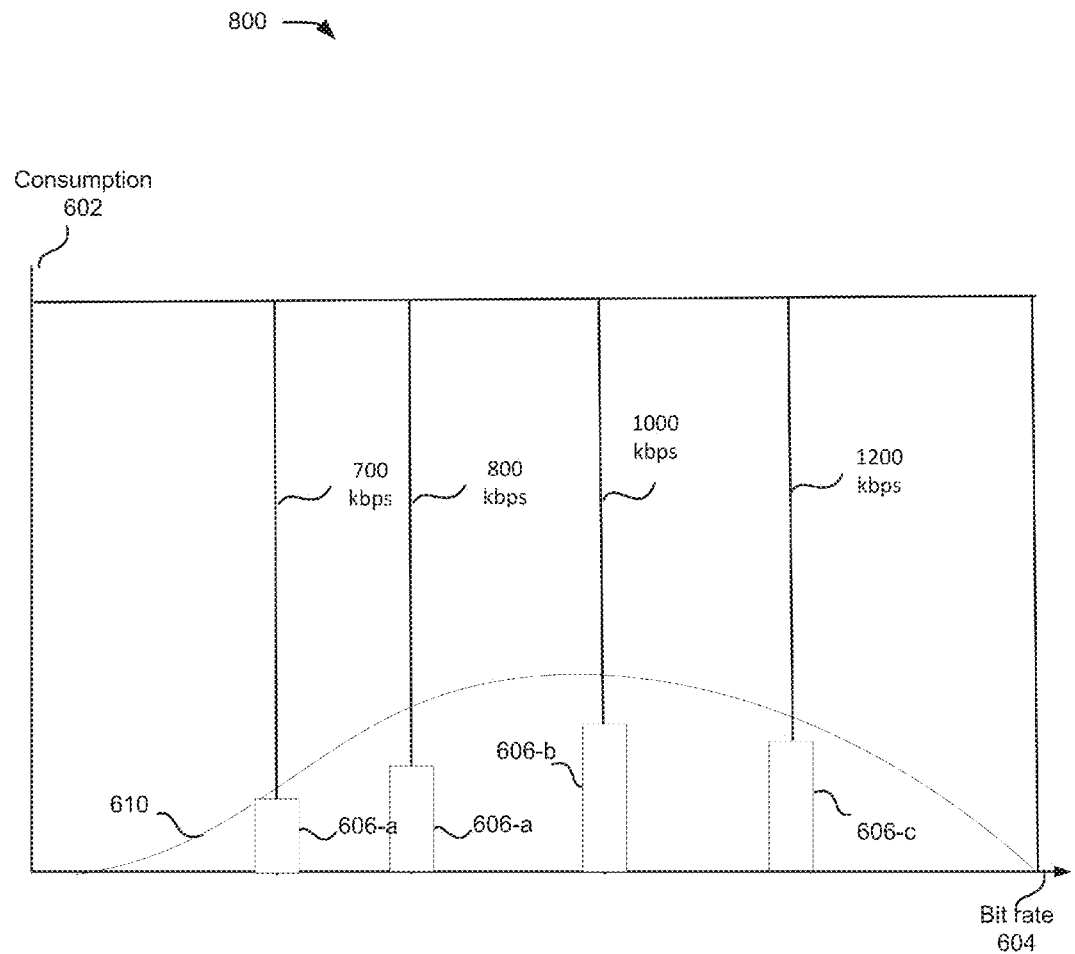
FIG. 8 illustrates an exemplary projected optimized bit rate stream consumption distribution corresponding to the optimized variant playlist of FIG. 7.

FIG. 8 illustrates an exemplary projected optimized bit rate stream consumption distribution 800. Projected optimized bit rate stream consumption distribution 800 may be determined based on consumption metrics for client devices 112 that select content based on OVPs 120. OVPs 120 may be provided to different client devices 112 based on attributes associated with the client devices 112.

As shown in FIG. 8, projected optimized bit rate stream consumption distribution 800 may indicate an amount of consumption by one or more client devices 112 of bit rate streams included in OVPs 120. In comparison to original expected usage distribution 610, projected optimized bit rate stream consumption distribution 800 minimize large jumps in quality between bit rate streams and more closely follow consumption distribution 600, based on the client devices 112 that receive the OVPs 120 increasing a usage of bit rate streams at higher bit rates in comparison to client devices 112 that receive IVPs 118. Projected optimized bit rate stream consumption distribution 800 may be simulated prior to variant playlist optimizer 110 providing instructions to content source 102 and segmenter 104 to generate OVPs 120 and corresponding optimized bit rate streams and to replace the current IVPs 118 and bit rate streams with the generated OVPs 120 and optimized bit rate streams. The implemented OVPs 120 may thereafter be identified as current IVPs 118 and current bit rate streams and the process may continue in an iterative manner to refine and increase the video quality provided to the client devices 112.

Variant playlist optimizer 110 may determine a selection of optimized bit rate streams to be included in the OVP 120 that substantially increases video quality provided to client devices 112. In instances in which a consumption distribution 600 forms a bell shaped curve, different bit rate streams may be implemented to flatten the distribution and move the consumption to higher bit rates. Variant playlist optimizer 110 in conjunction with content source 102 may create new variant (bit rate) streams one time and on demand based on the optimization.

Figure 9:
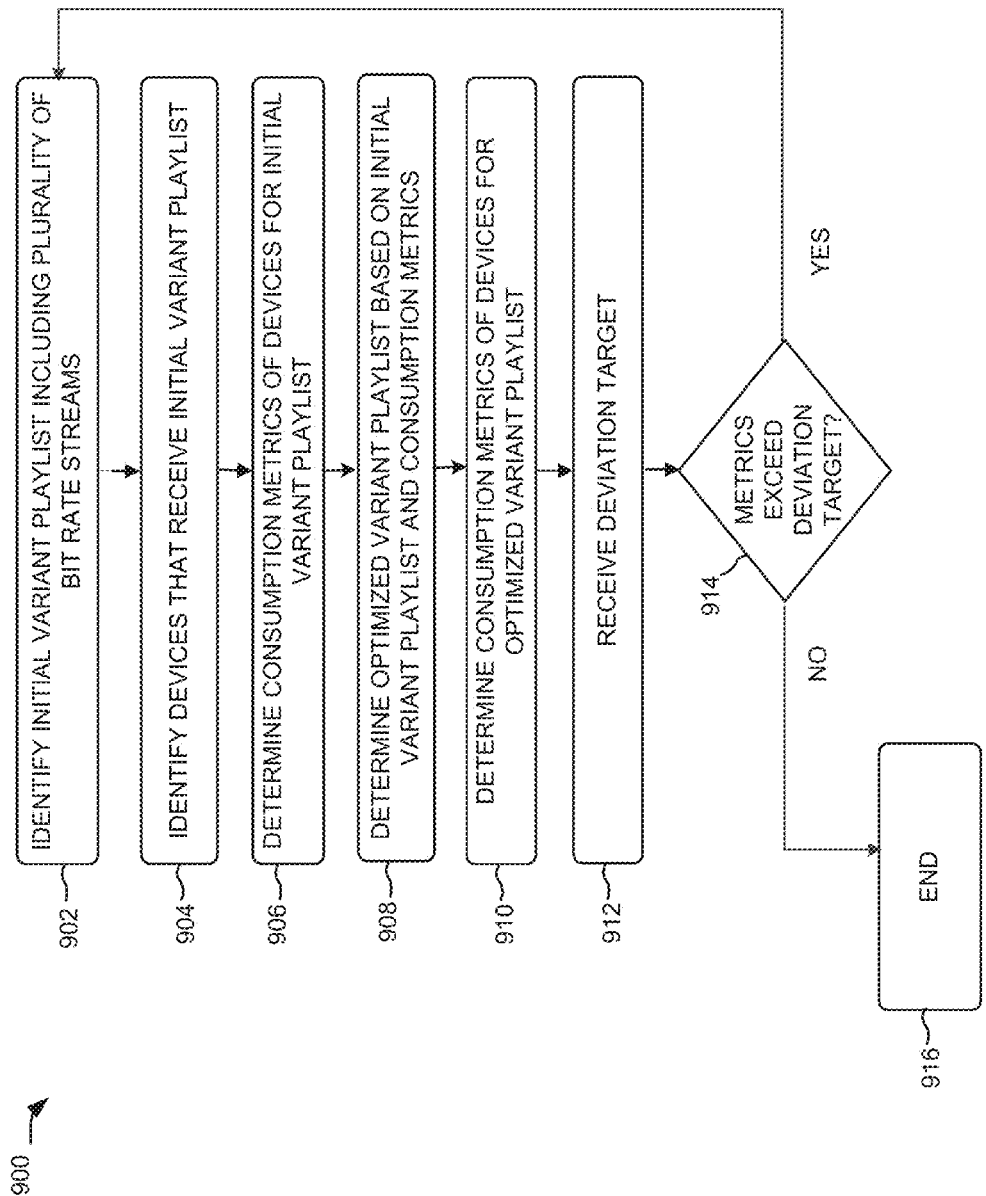
FIG. 9 is a flow diagram of an exemplary process for determining an optimized variant playlist according to an implementation described herein.

FIG. 9 is a flow diagram illustrating exemplary processing 900 associated with the above-described features of FIGS. 1-8. FIG. 9 is a flow chart of an exemplary process for implementing an optimized variant playlist according to implementations described herein. In one implementation, process 900 may be performed by variant playlist optimizer 110. In another implementation, some or all of process 900 may be performed by another device or group of devices, including or excluding variant playlist optimizer 110.

Processing 900 may begin with content source 102 generating variant bit rate streams and segmenter 104 generating an initial variant playlist 118 based on a profile definition for different types of client devices 112, such as PCs, connected TVs, etc. IVP 118 may reference or identify variant streams (bit rate streams), which may be encoded by content source 102 and segmented based on instructions included in the profile definition. IVPs may be deployed to devices, such as content server 106 and playlist server 108, which provide content from a service provider to client devices 112.

At block 902, variant playlist optimizer 110 may identify IVP 118 including a plurality of bit rate streams listed in the IVP 118. For example, variant playlist optimizer 110 may receive an IVP 118 that is to be optimized.

Variant playlist optimizer 110 may identify client devices 112 that select content from the service provider network based on the IVP 118 (block 904). For example, variant playlist optimizer 110 may receive information indicating that the particular IVP 118 is provided to PCs (e.g., PC initial variant playlist 118-1 described hereinabove with respect to FIG. 5).

Variant playlist optimizer 110 may determine consumption metrics for the identified client devices 112 for different bit rate streams listed in the IVPs 118 (block 906). For example, variant playlist optimizer 110 may receive information indicating a time and duration that each of the bit rate streams included in IVP 118 was provided to client devices 112. In some implementations, variant playlist optimizer 110 may determine consumption metrics of client devices 112 for the different bit rate streams included in IVP 118 based on bandwidth constraints associated with the client devices 112. The bandwidth constraints may be imposed based on factors common to subgroups of client devices 112, such as a geographical location of the client devices 112, an ISP, or a type of network that connects the client devices 112 to the service provider).

At block 908, variant playlist optimizer 110 may determine an optimized variant playlist based on the IVP 118 and consumption metrics of the client devices for bit rate streams included in the IVP 118. Variant playlist optimizer 110 may determine the optimized variant playlist to substantially optimize video quality based on streaming resource constraints associated with the client devices 112. The video quality is a function to the bit rate and therefore the variant playlist optimizer may increase the video quality provided to client devices 112 by increasing the bit rates (i.e., bit rate streams) provided to client devices 112. The client devices 112 may use as much bandwidth available. For example, variant playlist optimizer 110 may determine OVP 120 that substantially decreases a difference in a next available bit rate for client devices 112 and allows the client devices 112 to stream the content item at a substantially higher video quality (e.g., resolution, etc.). Variant playlist optimizer 110 may optimize IVPs 118 by creating different bit rate streams to form OVPs 120 or, in instances in which the client devices 112 associated with a particular IVP 118 can be subdivided into different subgroups, create new OVPs based on factors common to the subgroups, such as networks, etc.

In one implementation, variant playlist optimizer 110 may determine a minimum bit rate stream. Variant playlist optimizer 110 may receive a bandwidth error indication for the client devices 112. The bandwidth error indication may identify a number of instances at which a bandwidth capacity of the client device 112 is lower than a current lowest bit rate stream. For example, the client device 112 may send an error message if the available bandwidth is lower than a current lowest bit rate stream or request a low bit rate audio feed. Variant playlist optimizer 110 may identify a threshold number of instances in which the bandwidth error indication is to be received. Variant playlist optimizer 110 may generate the minimum bit rate stream at a lower bit rate than a bit rate of the current lowest bit stream in IVP 118 in response to a determination that the bandwidth error indication is higher than the threshold.

Variant playlist optimizer 110 may determine consumption metrics for the client devices 112 (or subgroup of client devices 112) that receive content from the service provider network based on the OVPs 120 (block 910). For example, variant playlist optimizer 110 may deploy the OVPs 120 to the service provider network. Alternatively, variant playlist optimizer 110 may execute a simulation of the client devices 112 receiving content from the service provider network based on the OVPs 120. Variant playlist optimizer 110 may determine the simulation based on information regarding previous consumption of content from the service provider network by the client devices 112.

Variant playlist optimizer 110 may receive a deviation target for the consumption metrics of the client devices 112 for the OVPs 120 (block 912). The deviation target may identify a maximum deviation of the actual consumption metrics from the projected consumption metrics of the bit rate streams included in the OVPs 120. For example, the deviation target may identify a target deviation from the optimized consumption metrics for the client devices 112 based on a standard deviation from the projected consumption metrics for the client devices 112.

Variant playlist optimizer 110 may determine whether the consumption metrics for the client devices 112 associated with the OVP 120 exceeds the deviation target (block 914). If the consumption metrics for the client devices 112 associated with the OVP 120 does not exceed the deviation target (i.e., the difference between consumption metrics for the bit rate streams associated with OVP 120 by the client devices 112 is lower than deviation target), variant playlist optimizer 110 may end the process at block 916. However, if the consumption metrics for the client devices 112 associated with the OVP 120 exceed the deviation target, variant playlist optimizer 110 may identify OVP 120 as a current IVP 118 and repeat the optimization process at block 902. This iterative process may continue until the consumption metrics for the client devices 112 associated with the OVP 120 fall within the deviation target.

Embodiments described above relate to devices, methods, and systems for optimizing variant playlist provided by a service provider to optimize or substantially increase usage experience by client devices given capacity restriction regarding the number of playlist available within a variant playlist. By refining initial variant playlists to create optimized variant playlists and, in some instances, creating new optimized variant playlist corresponding to subgroups of devices, the above-described systems and methods substantially optimize streaming resources such as bit rate or resolution provided to client devices.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method, comprising:
   identifying at least one initial variant playlist for a content item, wherein the at least one initial variant playlist lists a first plurality of bit rate streams;
   identifying at least one client device that receives the content item based on at least one of the first plurality of bit rate streams in the at least one initial variant playlist;
   determining bit rate stream consumption metrics of the at least one client device for the content item based on a statistical distribution of the first plurality of bit rate streams in the at least one initial variant playlist;
   determining an optimized variant playlist based on the at least one initial variant playlist and the bit rate stream consumption metrics of the at least one client device for the first plurality of bit rate streams, wherein the optimized variant playlist lists a second plurality of bit rate streams and substantially optimizes video quality based on streaming resource constraints associated with the at least one client device; and
   providing the content item to the at least one client device based on the optimized variant playlist.

2. The method of claim 1, further comprising:
   receiving a deviation target for optimized bit rate stream consumption metrics of the at least one client device based on the optimized variant playlist, wherein the deviation target identifies a maximum deviation of actual bit stream consumption metrics from projected bit stream consumption metrics;
   measuring the bit rate stream consumption metrics of the at least one client device;
   determining whether the bit rate stream consumption metrics exceeds the deviation target; and
   replacing the at least one initial variant playlist with the optimized variant playlist.

3. The method of claim 1, wherein the at least one initial variant playlist is selected from at least one of a personal computer playlist, a mobile device playlist or a connected television playlist.

4. The method of claim 1, wherein the at least one client device comprises a plurality of client devices, further comprising:
   identifying a subgroup of the plurality of client devices that have a same consumption pattern for the first plurality of bit rate streams;
   identifying common characteristics associated with the subgroup that have the same consumption pattern; and
   determining the optimized variant playlist based on the common characteristics.

5. The method of claim 4, wherein identifying the common characteristics associated with the subgroups further comprises:
   identifying a bandwidth constraint associated with the subgroup, wherein the bandwidth constraint is based on at least one of a geographical location, an Internet service provider, or a network associated with the subgroup.

6. The method of claim 1, wherein determining the optimized variant playlist further comprises:
   determining an optimized bit stream to be included in the optimized variant playlist to substantially reduce a difference between a first bit rate and a next available bit rate allows the at least one client device to stream the content item at a higher video quality.

7. The method of claim 1, further comprising:
   determining a number of bit rate streams to be included in the optimized variant playlist within a threshold maximum number of bit rate streams.

8. The method of claim 1, further comprising:
determining a minimum bit rate stream to be listed in the optimized variant playlist.

9. The method of claim 8, wherein determining the minimum bit rate stream further comprises:
receiving a bandwidth error indication, wherein the bandwidth error indication identifies a number of instances at which a bandwidth capacity of the at least one client device is lower than a current lowest bit rate stream;
identifying a threshold for the bandwidth error indication; and
generating the minimum bit rate stream at a lower bit rate than a bit rate of the current lowest bit stream in response to a determination that the bandwidth error indication is higher than the threshold.

10. The method of claim 1, further comprising:
identifying a first set of prospective optimized streams to be generated in association with a first optimized variant playlist for a first group of client devices;
identifying a second set of prospective optimized streams to be generated in association with a second optimized variant playlist for a second group of client devices;
comparing the first set of prospective optimized streams and the second set of prospective optimized streams to determine overlap in the first set of prospective optimized streams and the second set of prospective optimized streams; and
determining whether to generate prospective optimized streams based on overlap of prospective optimized streams.

11. The method of claim 1, further comprising:
determining whether to generate the optimized variant playlist based on processing costs associated with generating at least one optimized bit rate stream included in the optimized variant playlist.

12. The method of claim 1, wherein determining the optimized variant playlist further comprises:
replacing at least one of the first plurality of bit rate streams in the initial variant playlist with an optimized stream.

13. The method of claim 12, further comprising:
selecting the at least one of the first plurality of bit rate streams to be replaced based on a low usage rate of the at least one of the first plurality of bit rate streams.

14. A network device comprising:
a memory to store a plurality of instructions; and
a processor configured to execute the instructions in the memory to:
identify at least one initial variant playlist for a content item, wherein the at least one initial variant playlist lists a first plurality of bit rate streams,
identify at least one client device that receives the content item based on at least one of the first plurality of bit rate streams in the at least one initial variant playlist,
determine a statistical distribution of bit rate stream consumption metrics of the at least one client device for the content item based on the at least one initial variant playlist,
determine an optimized variant playlist based on the initial variant playlist and the statistical distribution of the consumption metrics of the at least one client device for the first plurality of bit rate streams, wherein the optimized variant playlist lists a second plurality of bit rate streams and substantially optimizes video quality based on streaming resource constraints associated with the at least one client device, and
provide the content item to the at least one client device based on the optimized variant playlist.

15. The device of claim 14, wherein the processor is further to:
receive a deviation target for optimized bit rate stream consumption metrics of the at least one client device based on the optimized variant playlist, wherein the deviation target identifies a maximum deviation of actual bit stream consumption metrics from projected bit stream consumption metrics,
measure the bit rate stream consumption metrics of the at least one client device,
determine whether the bit rate stream consumption metrics exceeds the deviation target, and
replace the at least one initial variant playlist with the optimized variant playlist.

16. The device of claim 14, wherein the processor is further to:
select the at least one initial variant playlist from one of a personal computer playlist, a mobile device playlist or a connected television playlist.

17. The device of claim 14, wherein the processor is further to:
identify a subgroup of the plurality of client devices that have a same consumption pattern for the first plurality of bit rate streams;
identify common characteristics associated with the subgroup that have the same consumption pattern; and
determine the optimized variant playlist based on the common characteristics.

18. The device of claim 14, wherein the processor is further to:
determine a distribution of streaming resource capacity of the at least one client device; and
determine an optimized bit stream to be included in the optimized variant playlist, wherein the optimized variant playlist substantially reduces a difference between the distribution of streaming resource capacity and the consumption metrics.

19. A non-transitory computer-readable medium including instructions to be executed by a processor in a user device, the instructions including one or more instructions, when executed by the processor, for causing the processor to:
identify at least one initial variant playlist for a content item, wherein the at least one initial variant playlist lists a first plurality of bit rate streams,
identify at least one client device that receives the content item based on the at least one initial variant playlist,
determine a statistical distribution of bit rate stream consumption metrics of the at least one client device for the content item based on the at least one initial variant playlist,
determine an optimized variant playlist based on the initial variant playlist and the statistical distribution of the consumption metrics of the at least one client device for the first plurality of bit rate streams, wherein the optimized variant playlist lists a second plurality of bit rate streams and substantially optimizes video quality based on streaming resource constraints associated with the at least one client device, and
provide the content item to the at least one client device based on the optimized variant playlist.

20. The non-transitory computer-readable medium of claim 19,
  wherein the processor is configured to:
    receive a deviation target for optimized bit rate stream consumption metrics of the at least one client device based on optimized variant playlist,
    measure the bit rate stream consumption metrics of the at least one client device,
    determine whether the bit rate stream consumption metrics exceeds the deviation target, and
    replace the at least one initial variant playlist with the optimized variant playlist.

* * * * *